United States Patent [19]

Fairbanks

[11] 4,042,136
[45] Aug. 16, 1977

[54] MOBILE LOADING APPARATUS FOR LARGE ARTICLES

[75] Inventor: Philip R. Fairbanks, Nampa, Idaho

[73] Assignee: Idaho Concrete Pipe Co., Inc., Nampa, Idaho ; a part interest

[21] Appl. No.: 736,746

[22] Filed: Oct. 28, 1976

[51] Int. Cl.² ............................................. B60P 1/00
[52] U.S. Cl. ............................... 214/146.5; 214/501; 280/179 A
[58] Field of Search ............... 214/75 R, 77 R, 146.5, 214/501, 505; 280/179 A

[56] References Cited
U.S. PATENT DOCUMENTS

| | | | |
|---|---|---|---|
| 3,067,966 | 12/1962 | Hicks | 214/146.5 X |
| 3,471,046 | 10/1969 | Hess | 214/501 |

Primary Examiner—Robert G. Sheridan
Attorney, Agent, or Firm—James D. Givnan, Jr.

[57] ABSTRACT

A tiltable load supporting carriage is roller mounted on front and rear guideways supported by a vehicle frame. A hydraulic cylinder imparts lengthwise movement to the carriage with the front guideways being upwardly inclined to elevate the forward end of the carriage while the rear guideways, having downwardly inclined segments, simultaneously lower the carriage rearward end. A rear pair of carriage rollers are seated, during carriage tilting, in the lowermost ends the rear guideways and thereat serve as fixed pivots during further carriage tilting. The load is secured on the carriage by straps with supplemental load securement being by a wire rope cinched about the load by a hydraulic cylinder.

7 Claims, 5 Drawing Figures

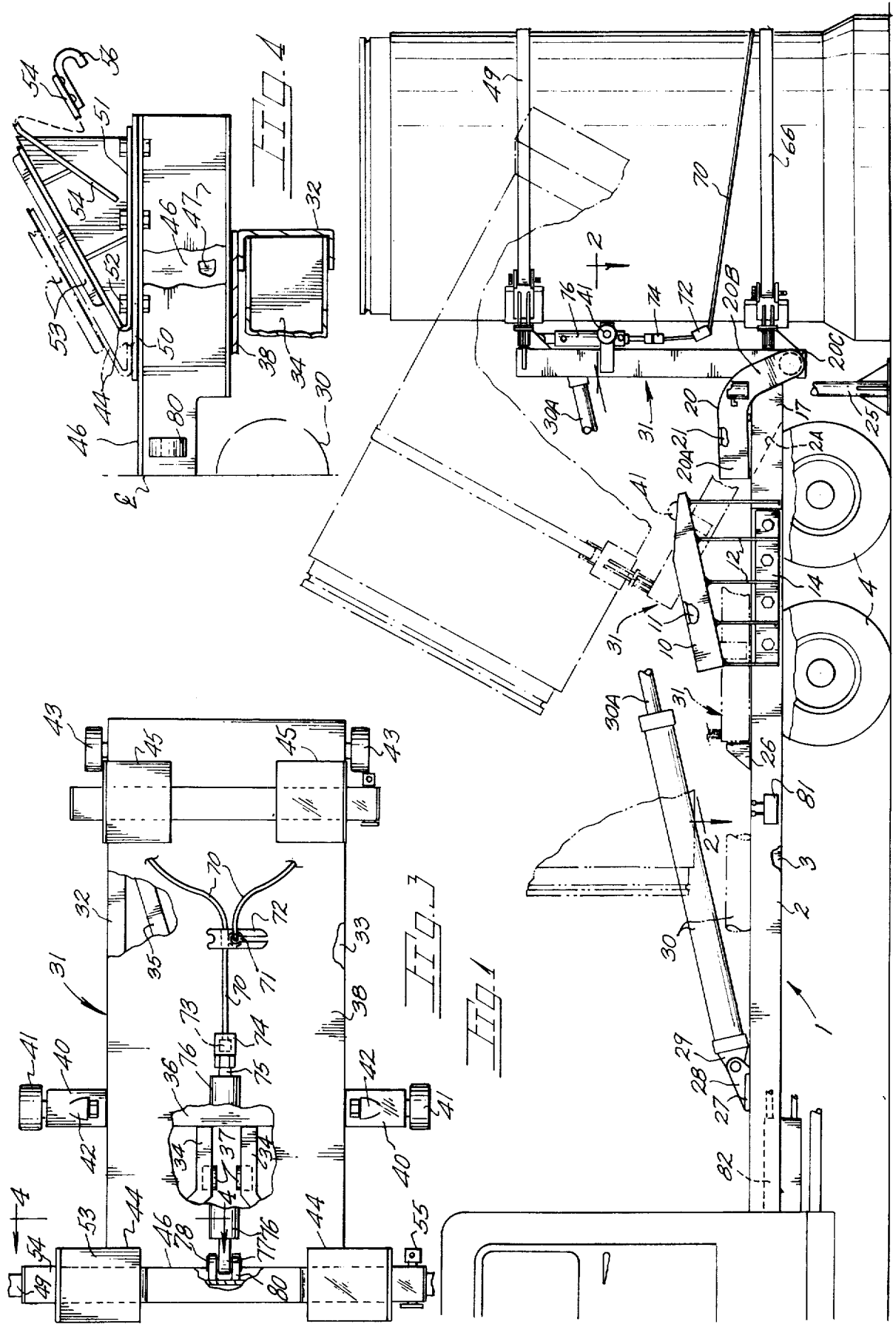

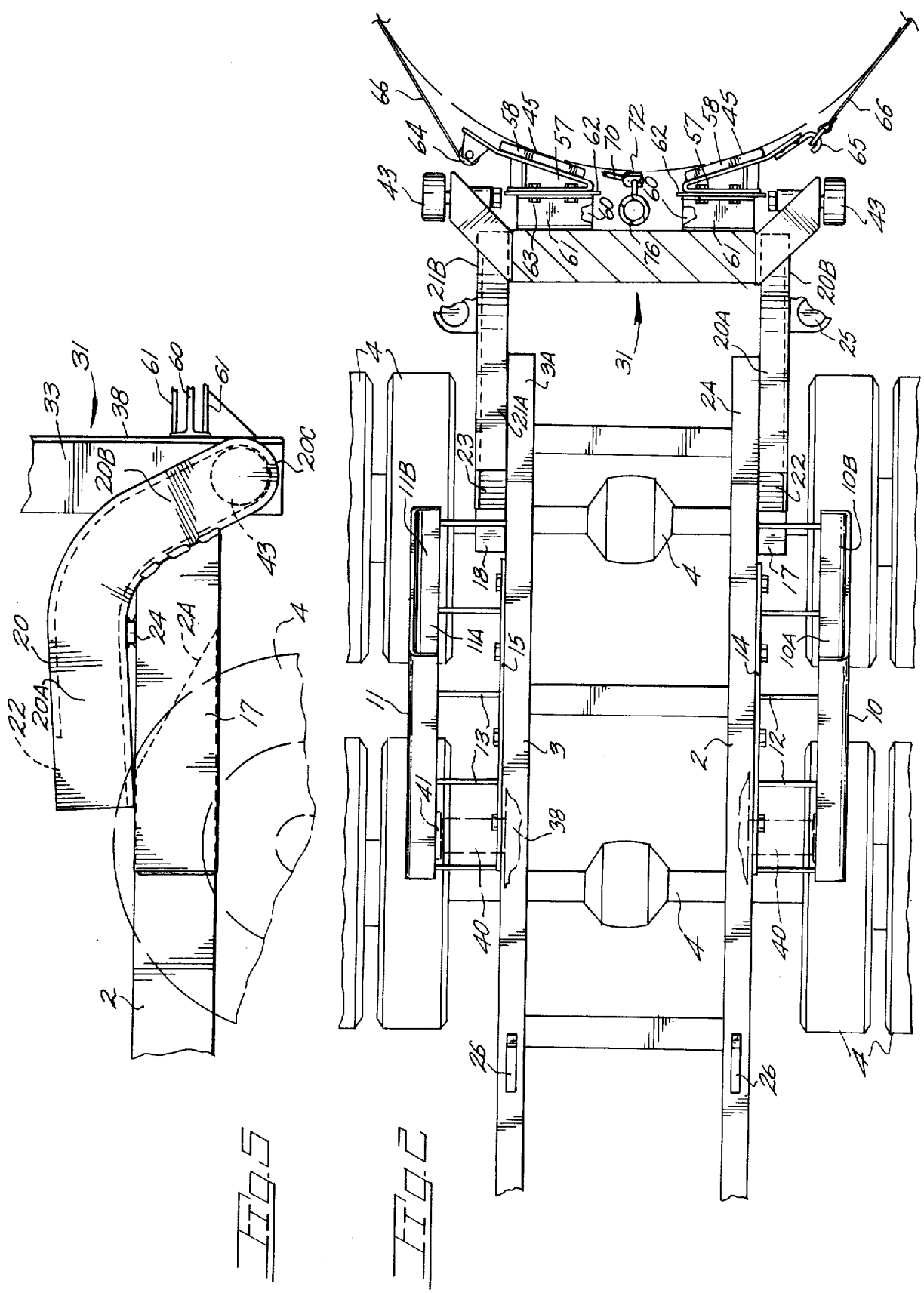

MOBILE LOADING APPARATUS FOR LARGE ARTICLES

BACKGROUND OF THE INVENTION

The present invention relates generally to truck mounted equipment for the loading, transport and unloading of large articles. The present invention specifically pertains to that type of apparatus for loading and unloading of an upright article which is tipped on its side for transport from a loading to an unloading site.

A large monolithic structure such as a concrete pipe section is particularly cumbersome to load and transport for obvious reasons. Commonly, costly motorized cranes are utilized in the removal of such conduit from its casting site in a plant to a storage yard. Transport from the plant storage yard to a remote installation site is normally by a flat-bed truck with motorized cranes again being used both at the on-loading and at the off-loading points. Accordingly, costly motorized crane eqiupment must be on hand at both the loading and remote unloading point with such equipment additionally incurring the high cost of a skilled crane operator. Additionally, manufacturers of concrete pipe are faced with the task of moving and storing same in an upright position to avoid distortion which otherwise occurs when newly formed conduit is stored on its side. An additional advantage of upright storage is the conservation of space. While the above mentioned problems are related to concrete pipe, similar problems are encountered in the storage and transport of other large monolithic structures such as utility vaults, manhole structures, etc.

Prior U.S. patents have disclosed various apparatuses for the transport of large structures each elaborating upon the advantages of horizontal transport from a vertical loading-unloading position. The examples of the prior art disclosures are found in U.S. Pat. Nos. 1,289,786; 3,674,166; 3,687,319; 3,848,758 all of which disclose apparatuses adapted for the transport of large monolithic articles while additional U.S. Pat. Nos. 2,189,052 and 2,308,648 disclose dump beds on which are carried aggregate loads. The aforementioned U.S. patents are mentioned simply as being exemplary of the prior art. For one reason or another, none of the known prior art apparatuses have apparently been received with a high degree of acceptance.

SUMMARY OF THE PRESENT INVENTION

The present invention is embodied within a vehicle supported apparatus which includes a tiltable load supporting carriage having roller elements being confined for a portion of their travel along inclined guideways on the vehicle.

The tiltable carriage is supported adjacent its forward and rearward ends by roller elements some of which are in permanent entrainment within a rear pair of guideways while forward roller elements move both along inclined guideways and therebeyond in an arcuate path about a fixed axis. The tiltable carriage is underslung in that the main body of same is lower than the forwardly mounted roller permitting the tiltable carriage to rest in supported engagement with the vehicle frame members during transport. The vehicle may be readily modified for other load transporting tasks by reason of certain of the guideways being detachable mounted.

The tiltable load supporting carriage includes a load securing arrangement which utilizes a length of flexible wire rope which circumvents the load in a tensioned manner to retain same against slippage. Powered means, such as a hydraulic cylinder, is provided to cinch the wire rope about the load.

Important objectives of the present invention include the provision of a tiltable load supporting carriage providing for arcuate movement of the load and carriage about a fixed axis for a greater part of carriage travel to assure positive control of the load during loading and unloading operations; the provision of an apparatus greatly facilitating the loading of large, heavy structures with a novel arrangement of guideways permitting the use of a relatively small size carriage prime mover; the provision of load securing means in place on the tiltable carriage which binds the load against vertical slippage during travel in the upright range; the provision of an apparatus for attachment to a truck chassis with but minor modification of the truck permitting return to its original configuration for other transporting duties; the provision of an apparatus where intial unloading movement of a load supporting carriage is upwardly along a front pair of guideways while the rearward end of the carriage descends which jointly enable the use of a relatively low powered hydraulic cylinder as a prime mover since adequate leverage is present at all times.

BRIEF DESCRIPTION OF THE DRAWINGS

In the accompanying drawings:

FIG. 1 is a side elevational view of the rearward portion of a truck chassis fitted with the present apparatus with a carriage shown in the upright loading-unloading position;

FIG. 2 is a view taken downwardly along line 2—2 of FIG. 1;

FIG. 3 is a plan view of the carriage removed from truck mounted guideways;

FIG. 4 is a sectional elevational view taken along line 4—4 of FIG. 3 showing details of the carriage and load supporting pad structures thereon; and FIG. 5 is enlarged fragmentary view of the rearward end of a truck frame member with a typical rear guideway mounted thereon.

DETAILED DESCRIPTION OF THE PREFERRED EMBODIMENT

With continuing attention to the accompanying drawings wherein applied reference numerals indicate parts similarly identified in the following description, the reference numeral 1 indicates generally a truck chassis conventionally including frame members 2 and 3 supported by an undercarriage 4. The frame is suitably crossbraced in accordance with the standard truck frame construction.

A front pair of guideways are indicated at 10 and 11, each being of channel construction with upper and lower flanges with the lower flange 10a-11a (FIG. 2) of each guideway constituting an inclined, roller supporting path or surface. The rearward end of each guideway is open at 10b and 11b to permit unobstructed passage of later described roller elements out of and into contact with the guideway lower flanges. Each guideway 10 and 11 is supported on a truck frame member by multiple mounting plates 12 and 13 which terminate at their lower ends in supported engagement with the respective frame member. To permit the truck to be used for other purposes, the guideways may be removably mounted to the truck frame members by means of mounting plates 14–15 being bolted at points therealong to the frame member. In one embodiment of the invention guideway inclination of approximately 15° has proved satisfactory.

A rear pair of guideways 20–21 are mounted somewhat outboard of the rearward ends of the truck frame members 2 and 3 by means of channel shaped frame extensions at 17 and 18 which are secured to the outer surfaces of the members and extend rearwardly therebeyond. For purposes of adequate clearance, truck frame members are canted at 2a and 3a. Secured atop said frame extensions 17 and 18 are the rear pair of guideways 20 and 21 which also are of channel like construction each having a substantially horizontal segment 20a–21a and a downwardly and rearwardly inclined segment 20b–21b Horizontal segments 20a–21a are downwardly and forwardly pitched approximately 2° by means of spacer elements as at 24 (FIG. 5) for purposes later elaborated upon. The rearwardly and downwardly inclined segments 20b–21b being approximately 115° included angle from their horizontal segments 20a–21a. Again, the lower most inner surface of each guideway constitutes a path for an entrained roller described in connection with the tiltable carriage. Each rear guideway is preferably relieved along its upper wall surface at 22 and 23 (FIG. 2) to permit passage of the entrained roller element to enable removal of the later-described carriage. Extendable outrigger supports at 25 are carried by the rear guideways and may be lowered into ground engagement for frame stabilization during operation under heavy loads. Each rear guideway terminates downwardly in a curved end wall as at 20c of a radius corresponding to that of a roller element of the carriage.

With attention to the truck frame the same is additionally provided with stops at 26 against which the carriage abuts when in its transport position. Truck frame members 2 and 3 support a crossmember 27 which in turn supports clevis 28 in pinned engagement with the tang 29 of a hydraulic cylinder 30.

A tiltable carriage is indicated generally at 31 and is adapted for both arcuate as well as fore and aft sliding movement relative to the truck frame. The carriage, as best shown in FIG. 3, includes a frame of welded channel construction with side rails as at 32-33 with internal bracing by frame members at 34 and 35 with a crossmember at 36. A decking of steel plate 38 overlies the frame. Frame members 34 carry bosses 37 which receive the pin coupled end of a piston rod 30a of carriage prime mover shown as hydraulic cylinder 30. Secured to opposite sides of the carriage are weldments 40 which extend outwardly and upwardly therefrom to mount a front pair of rollers 41 in a plane offset above the carriage frame. Each roller includes a stub shaft suitable journalled as at 42. Accordingly the carriage may be termed as being underslung by reason of being lower (when horizontal) than its front rollers 41. A rear pair of rollers at 43 are journalled within bosses secured within the frame side rails.

With continuing attention to carriage 31 the same is provided fore and aft with pairs of load supporting pad structures 44–45 each being adjustable with respect to the carriage center line to accomodate various sized loads. One of the front load pads 44 is best shown in FIG. 4 and is supported by a crossbeam 46 which is of I-beam construction reinforced by vertical plates 47 (FIG. 4) welded intermediate the I-beam flanges. Superimposed on the upper flanges of the I-beam are plates as at 50 on which are adjustably mounted pad weldments 51 with bolt assemblies 52 extending through selected apertures in the weldment, plate and I-beam flange. Accordingly, weldments 51 may be positioned to best suit the load being transported. Each weldment 51 is provided with a resilient pad at 53. Plates 54 project outwardly from each weldment to receive a ratchet equipped winch 55 or a hook 56 to secure a load binding strap 49.

The rear pair of load supporting pad structures 45 are similar to the front pad structures but are located closer to the carriage center line for clearance purposes. With attention to FIG. 2, each rear pad structure includes a weldment 57, suitably braced, and provided with a resilient pad 58 for load support. An I-beam segment 60 is flange reinforced by intermediate plates 61. A plate 62 on each I-beam segment is apertured to selectively receive bolt assemblies 63 passing through a weldment plate thereby enabling lateral adjustment of the pad structures 45 to best accomodate the load size. As with the front load pad structures, the rear pair of pad structures are fitted with a plate mounted strap winch 64 and a strap hook 65 securing a load binder strap 66. Such winch strap and components may be conventional.

Means securing the load (shown as a concrete conduit) against slippage when the carriage is upright, as during the initial stage of loading or terminal stage of unloading, includes a length of wire rope 70 (FIG. 3) encircling the load. The wire rope is dead ended by means of an end ferrule 71 retained within a choker hook 72 of the well known type widely used in logging. The remaining end of wire rope 70 slidably passes through the choker hook and is fitted with a ferrule 73 which is retained within a second choker type socket 74 secured to the end of a piston rod 75 of a cylinder 76. Accordingly, wire rope 70 is both capable of being cinched about the load by retraction of piston rod 75 as well as being readily replaceable by disengagement of the ferrules from their respective socket and hook. To accomodate side loads on cylinder 76 during wire rope tightening, the cylinder is provided with a tang 77 through which a pin 78 extends. A clevis 80 secures pin 78. Wire rope 70 may be readily interchanged with ropes of other lengths for the particular load being transported. Tensioning of the rope by hydraulic cylinder 76 serves to bind the load against slippage as in the manner a logging choker set about a log or logs prevents slippage once the choker cable is taut.

The hydraulic system, which includes prime mover cylinder 30 for the tiltable carriage as well as hydraulic cylinder 76 for cinching wire rope 70, further includes a control valve assembly 81 which may be mounted adjacent the apparatus as on a frame member per FIG. 1. A reservoir 82 provides a source for a double acting pump (not shown) the output of which are routed through a pair of four-way valves in valve assembly 80 to provide full, independent actuation of the hydraulic cylinders. The hydraulic system may include other components and is believed to be obvious to those skilled in the art.

A loading sequence involves the backing of the vehicle, with carriage 31 upright, to engage support pad structures 44–45 with conduit surfaces. If desired, the conduit may be pallet supported. Straps 49 and 66 are drawn about the conduit and secured to their respective hooks 56, 65 whereupon the associated winches 55, 64 are actuated. Load securing means including wire rope 70 is then passed about the load and its end ferrule 71 snugly engaged with choker hook 72. Piston rod 75 of cylinder 76 is extended during such ferrule securement whereafter the cylinder is energized via an aforementioned valve in valve assembly 81 to retract the piston rod to draw wire rope 70 tightly about the conduit. Accordingly, the wire rope is cinched about the conduit in much the same manner as a choker is drawn about a log or logs. Slippage of the load during initial tilting movement or during the later stages of upright travel is prevented. Load straps 49, 66 supplement the securing action of the wire rope. During transport, the carriage 31 rests on the upper surfaces of frame members 2 and 3 and abuts stops 26 while front and rear pairs of rollers 41, 43 ride within the forward end portions of their respective guideways. Cylinder 30 is, of course, locked by its valve control. Importantly, forward tilting of the loaded carriage occurs about the axis of the rear rollers with a substantial arm provided between said axis and the piston rod attachment point. Of further importance is the feature of the forward pair of rollers 41 therefter coming into engagement with the inclined front guideways 10 and 11 at which time a sizeable portion of the load mass is forward of a vertical plane containing the front roller axis. Such load positioning contributes to the ease of subsequent carriage travel downwardly along the front guideways. Simultaneously, the rear rollers 43 are being drawn up the inclined segments 20b-21b of the rear guideways. As a substantial portion of the load has been transferred to front guideways 10, 11 and with the front rollers acting as a 1st degree fulcrum, cylinder 30 readily draws rear rollers 43 upwardly along inclined segments 20b, 21b.

In an unloading sequence, rearward displacement of carriage 30 is initiated by the extension of piston rod 30a causing upward tilting of the carriage by reason of front rollers 41 traversing guideway 10 and 11. Prior to the departure of the front rollers from their guideways, rear rollers 43 have come to rest against the curved end walls as at 20c. At this point in the sequence (broken line raised position of FIG. 1) cylinder 30 has an advantageous arm to accomplish the arcuate range of travel about the axis of the rear rollers. At all times, during both loading and unloading sequences, the operator has a high degree of control over the load. Extension of load securing cylinder 76 slackens flexible member 70 for removal of end ferrule 71 from choker hook 72 to complete load release from the carriage.

While I have shown but one embodiment of the invention it will be apparent to those skilled in the art that the invention may be embodied still otherwise without departing from the spirit and scope of the invention claimed.

Having thus described the invention what is desired to be secured under a Letters Patent is:

1. In a vehicle for transporting articles of substantial mass, said vehicle including a frame and undercarriage, the improvement comprising, a tiltable carriage movable between an upright loading-unloading position and a horizontal load transporting position, load securing means on said carriage, a front pair of guideways with each guideway offset upwardly from a frame member of the vehicle, each guideway constituting an inclined pathway, a rear pair of guideways supported by said frame members and each having angularly disposed segments with one segment thereof being downwardly and rearwardly inclined relative to the vehicle frame, front and rear roller means on said carriage and respectively entrained for travel on said front and rear guideways and operable to confine the carrier for travel between upright and horizontal extreme positions, said rear roller means and the lower terminus of said rearwardly inclined guideway segments coacting to support the carriage for pivotal movement of the carriage about a fixed axis during tilting movement immediately prior and subsequent the carriage upright loading position, remaining carriage travel being determined by the travel of said front roller means along the inclined pathways of the front guideways and the travel of said rear roller means along the angularly disposed segments of said rear pair of guideways, and powered means carried by the vehicle and acting on the carriage throughout both arcuate travel of same about said fixed axis and coterminous travel along said guideways.

2. The improvement claimed in claim 1 wherein said carriage is in underslung relationship with said front roller means.

3. The improvement claimed in claim 1 wherein said pairs of front and rear guideways define openings for roller means passage permitting upward removal of the carriage from the vehicle.

4. The improvement claimed in claim 1 wherein said front pair of guideways are detachably mounted on the vehicle frame.

5. The improvement claimed in claim 1 wherein said load securing means includes a flexible member for looped entrainment about the load, powered means on said carriage acting on one end of said flexible member to draw the looped portion thereof upwardly and inwardly to bind the load against slippage when the carriage is upright.

6. The improvement claimed in claim 5 wherein said load securing means additionally includes a choker hook through which the flexible member may pass during tensioning by said powered means, said choker hook adapted to detachably retain the flexible member outer end.

7. The improvement claimed in claim 1 wherein said tiltable carriage includes front and rear load supporting pad structures, means attaching said structures to said carriage in a manner permitting lateral adjustment of said structures for load accomodation.

* * * * *